June 25, 1968 RYO IGARASHI 3,390,382
ASSOCIATIVE MEMORY ELEMENTS EMPLOYING
FIELD EFFECT TRANSISTORS
Filed Aug. 30, 1967 2 Sheets-Sheet 1

INVENTOR.
RYO IGARASHI
BY
OSTROLENK, FABER, GERB & SOFFEN
ATTORNEYS

INVENTOR.
RYO IGARASHI
BY
OSTROLENK, FABER, GERB & SOFFEN
ATTORNEYS

United States Patent Office 3,390,382

Patented June 25, 1968

3,390,382

ASSOCIATIVE MEMORY ELEMENTS EMPLOYING FIELD EFFECT TRANSISTORS

Ryo Igarashi, Tokyo, Japan, assignor to Nippon Electric Company Limited, Tokyo, Japan Filed Aug. 30, 1967, Ser. No. 664,382
Claims priority, application Japan, Aug. 31, 1966, 41/57,402; Sept. 26, 1966, 41/63,322
12 Claims. (Cl. 340—173)

ABSTRACT OF THE DISCLOSURE

Bistable transistor flip-flop elements in a memory bank provide operation of the elements in an associative, non-destructive comparison mode. First and second write-in transistors respectively provided for each transistor of the bistable element enable setting of the state of the flip-flop element in accordance with information to be stored. A pair of isolation transistors with their control terminals coupled to respective outputs of each flip-flop element insure non-destructive comparison of the state of the element with an interrogation signal. A non-matching comparison generates an output signal at a common terminal of the isolation transistors. A serially connected pair of transistors connected between terminals of each retrieval and write-in transistor reduce the number of terminal connections to each element by one-half. Field-effect transistors and integrated circuits are preferred in production of the flip-flop elements and the memory bank.

The instant invention relates to memory storage devices and more particularly to associative memory elements comprised of transistors, preferably of the field effect type, capable of providing write-in for indefinite storage of a bistable state and of performing non-destructive readout during an interrogation operation wherein complete isolation is provided between each memory element and the peripheral circuitry employed for an interrogation operation so as to absolutely guarantee non-destructive readout when a memory element is interrogated.

An associative memory system in which large plurality of memory elements are arranged in matrix form has been found to be extremely advantageous for use as one of the constituent elements comprising an electronic computer. For example, the technical paper "Application of Content-Addressed Memory for Dynamic Storage Allocation" authored by Yaohan Chu and appearing in the RCA Review March 1965 starting at p. 140, describes the use of such a memory device as one component element of an electronic computer which may be employed for transferring information stored in one address of a main memory device to another designated address. Another advantageous application for such associative memories is the ability to retrieve desired information by comparing information furnished from an external location, for example, from a computation control unit, with the stored contents of the associative memory device.

Associative memory elements which may be employed in such an associative memory device have also been described in copending application Ser. No. 602,726, filed Dec. 19, 1966 by the instant inventor and assigned to assignee of the instant invention. Such associative memory elements are described as being comprised of field effect transistors which are connected with a bistable circuit for read and write operations and a second circuit comprising field effect transistors coupled with the bistable circuit for performing an interrogation operation.

In associative memory elements of the type described in the above mentioned copending application, one of the interrogation field effect transistors is made conductive (i.e., turned ON) under control of an interrogation signal imposed upon this interrogation transistor. With this interrogation transistor being ON a current flows to a word sense terminal connected with another terminal of the interrogation field effect transistor which emanates from the bistable circuit. Unless the bistable circuit has a sufficient current supply capacity the additional current demand upon the bistable circuit will result in a destruction of the binary state stored in the bistable circuit yielding a non-destructive readout operation which is quite unreliable.

In addition thereto, it has been found that the amplitude of the voltage pulse representing the interrogation signal which is applied to one of the interrogation transistors is attenuated by a very significant amount so that the signal-to-noise ratio of the current arrived at the word-sense terminal of the element is quite small causing the recognition of the presence of the signal to be extremely difficult.

It is therefore a primary object of the instant invention to provide associative memory elements which are designed to be free from any of the above-mentioned defects which commonly are present in conventional associative memory elements of the type described herein and thereby provide associative memory elements in which the signal-to-noise ratio (i.e., hereinafter referred to as S/N) of the current developed in an interrogation MOS (metal oxide semiconductor) transistor as a result of the interrogation signal is quite large and further wherein the storage state of the memory element is free from any interference which normally occurs when the interrogation signal is applied to the memory element and which normally results in the destruction of the memory state stored in conventional memory elements.

The memory element in one preferred embodiment of the instant invention is comprised of first, second and third pairs of transistors, which are preferably of the field effect type. The first pair of transistors is connected in cross-couple fashion to form a bistable element which may hereinafter be referred to as a flip-flop. The second pair of transistors, each having first, second and third electrodes, is coupled so that a first electrode of each of the second pair is coupled to an associated output terminal of the bistable circuit; a second electrode of the pair is connected to a first common terminal and the third electrode of the pair is coupled to peripheral circuitry for writing in or sensing of the binary state of the flip-flop.

The third pair of transistors, each having first and second electrodes, is arranged so that a first electrode of the pair is coupled to an associated output of the flip-flop. The second electrode of the pair is coupled to a second common terminal and a third electrode of the pair is coupled to peripheral circuitry for performing a compare operation between a binary state provided from an external source and the binary state of the flip-ffop. The first electrodes of the third pair of transistors constitute control electrodes which together with an interogation signal selectively either cause the associated transistor to conduct or to be non-conductive representing mismatch or match, respectively, and further guarantees total isolation between the interogation signal applied to one of the third pair of transistors and the flip-flop circuit thereby absolutely preventing deterioration or destruction of the contents of the flip-flop.

The above-mentioned memory elements may be arranged in an ordered matrix (or matrices) to form a memory plane (or planes) each of which planes may be comprised of $m$ columns and $n$ rows providing a memory plane having a total of $m \times n$ memory elements. In order to access such a memory plane connections must be made to all of the appropriate terminals of each memory element which is comprised of a selective signal terminal used for driving the memory element into a selective state; a pair of interrogation terminals used for supplying an interrogation signal to at least one terminal thereof; a word-sense terminal whose output response to the interrogation signal to indicate match or mismatch between the memory state of the element and memory state of an externally located bit; and a pair of digit-sense terminals for writing a memory state into the element or for reading the memory state of the element. It can therefore be seen that each memory element has no less than six terminals all of which must be connected to appropriate peripheral circuitry for appropriate addressing and readout of the memory plane with an $m \times n$ number of elements in each memory plane and with each memory element requiring no less than six connections such memory elements become quite complex.

In order to overcome disadvantage of providing an over-powering number of connections the instant invention may be arranged in another preferred embodiment in which each memory element may be provided with a reduced number of terminals for connection to peripheral circuitry by employing the selective signal terminal as a terminal sharing the function for receiving the selective signal as well as operating as the word-sense terminal whose output response to an interrogation signal. In addition thereto, the two digit/digit-sense terminals may serve the dual functions of providing the digit/digit-sense operations as well as being capable of performing the function of operating as the interrogation terminals.

The preferred embodiment of the instant invention may thereby be further modified by providing fourth and fifth pairs of series connected transistors each pair of which is coupled between one electrode of one of said third pairs of transistors and one electrode of one of said second pairs of transistors. The common terminal between said second pair of transitsors thereby functions as both the signal selection terminal and the word-sense terminal. The remaining electrodes of said second pairs of transistors each of which are connected to one of said fourth and fifth pairs of transistors, respectively, thereby operate as both the digit/digit-sense terminals as well as the interrogation signal terminal. A reduction in the total number of terminals per memory element which must be connected to peripheral circuitry is thereby reducd by no less than on-half. This is made possible by appropriate application of selected voltage levels to the terminals dependent upon the particular operation desired. In the preferred embodiment of the instant invention having the reduced number of output terminals the fourth and fifth pairs of series connected transistors simulate an open-circuit during write-in and digit sense operation while becoming somewhat conductive during the word-sense operation to provide either a current flow at the output word-sense terminal in the case where there is mismatch between the stored memory state and the state of a memory element from an external source being compared therewith and which provides no current flow when the memory state stored and the external state are the same.

It is therefore one object of the instant invention to provide a novel memory element capable of performing the functions of storing either one of two memory states, providing non-destructive readout of the memory state stored therein and further providing the non-destructive signal indication of match or mismatch between the memory states stored therein and the state of an external information bit being compared therewith.

Another object of the instance invention is to provide a novel memory element for use in memory storage systems and the like comprised of a first pair of transistors arranged in cross-coupled fashion to form a bistable element, a second pair of transistors having one terminal of each connected to a common terminal and having second terminals of each connected to the output terminals of the bistable element and further having a third pair of transistors having one terminal of each connected to a common terminal and a gate terminal of each connected to the output terminals of said bistable element and being capable of receiving interrogation signals at at least one of their remaining terminals for providing a signal at the second common terminal indicative of either match or mismatch between the memory state stored and the bistable element compared with the binary state of an external information bit wherein interrogation occurs in a non-destructive manner and further wherein the interrogation signals are completely isolated from the bistable element so as to prevent any destruction or deterioration whatsoever of the memory states stored therein.

Another object of the instant invention is to provide a novel memory element for use in memory storage systems and the like comprised of a first pair of transistors arranged in cross-coupled fashion to form a bistable element, a second pair of transistors having one terminal of each connected to a common terminal and having second terminals of each connected to the output terminals of the bistable element and further having a third pair of transistors having one terminal of each connected to the common terminal and a gate terminal of each connected to the output terminals of said bistable element and being capable of receiving interrogation signals at at least one of their remaining terminals for providing a signal at the second common terminal indicative of either match or mismatch between the memory state stored and the bistable element compared with the binary state of an external information bit wherein interrogation occurs in a non-destructive manner and further wherein the interrogation signals are completely isolated from the bistable element so as to prevent any destruction or deterioration whatsoever of the memory states stored therein and wherein said memory elements may further be comprised of fourth and fifth pairs of series connected transistors coupled between said second and third pairs of transistors, respectively, for reducing the number of terminals of the memory element requiring connection to peripheral operating circuitry so as to significantly reduce the amount of connections required when such memory elements are used either singly or required in memory planes employing a large plurality of individual memory elements.

These as well as other objects will become apparent when reading the accompanying description and drawings in which.

Figure 1:
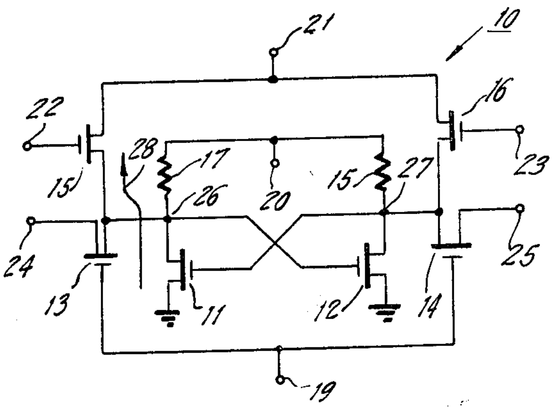
FIGURE 1 is a schematic diagram showing a conventional memory element.

Whereas the memory elements of the instant invention may employ a variety of types of transistors, one of the most useful types which may be employed to a great advantage in the memory element configuration are commonly referred to as the field effect transistors (FET's). A detailed explanation of such field effect transistors is set forth in copending U.S. application Ser. No. 611,868, filed Jan. 26, 1967 and assigned to the assignee of the instant invention. Additional descriptions are also set forth in copending U.S. application Ser. No. 602,726, filed Dec. 19, 1966 and assigned to the assignee of the instant invention. Making reference to these applications, a detailed explanation will therefore be omitted herein. For purposes of understanding the instant invention, however, this type of transistor, usually referred to as a normal "off" MOS (metal oxide semiconductor) transistor is usually fabricated in the following manner:

An n-type silicon substrate has two p-type regions formed thereon by a diffusion process wherein boron is diffused into the substrate. The two p-type regions are bridged by means of a silicon oxide film deposited on the surface of the substrate and making physical and electrical contact with the two p-type regions. Electrodes are formed on each of the p-type regions and the bridging region and are connected three associated terminals to facilitate electrical connection to peripheral circuitry. Of the two leads brought out from the p-type regions, one terminal connected with one lead is commonly referred to as a drain; the other terminal connected with the remaining p-type region is commonly referred to as a source; and the remaining terminal connected to the silicon oxide film is commonly referred to as a gate.

As is commonly known in the area of field effect transistor technology, it is possible to regulate the impedance between the drain and source electrodes through the application of a voltage to the gate electrode. The control voltage thereby regulates the current between the drain and source while a voltage differential is applied between the drain and source electrodes. For example, if the source is grounded and the drain has a negative voltage applied thereto a current will flow between the drain and source electrodes as the voltage applied to the gate is gradually varied from a zero reference potential to a more negative level. As the gate voltage reaches a large negative amplitude the current flowing between the drain and source electrodes is found to increase abruptly. The value of the gate voltage at the time that the current starts to flow between the drain and source is commonly referred to as the threshold voltage which is ordinarily denoted by the symbol $V_T$.

Electrical characteristics of MOS transistors vary, depending upon the relation of the electrical potential of the n-type silicon substrate with the source, drain and gate. However, such transistors are ordinarily used in a state where the electrical potential at the silicon substrate is held equal to or slightly higher than the higher of the two voltages applied to the drain and source electrodes. respectively.

FIGURE 1 shows a conventional associative memory element 10 which is also described in one of the above mentioned copending applications and, as shown herein, which is comprised of MOS transistors 11 and 12 connected in a cross-coupled fashion with one another and further connected to a power source 20 through resistors 17 and 18 to form a bistable element, i.e., an element capable of being driven to either one of two stable states and further being capable of remaining in the state to which it is driven for an indefinite period. The drain electrodes of the transistors are grounded whereas the source and gate electrodes are cross-coupled in the manner shown.

MOS transistors 13 and 14 are connected with their gates coupled in common to terminal 19 and their drain (or source) electrodes connected to the terminals 26 and 27. The remaining terminals 24 and 25 are adapted for connection to peripheral circuitry to perform writing or reading operations, in a manner to be more fully described.

Transistors 15 and 16 have one of their electrodes coupled in common to terminal 21, a second of their electrodes coupled to teminals 26 and 27 (the output terminals of the bistable element) and their gate electrodes coupled to terminals 22 and 23 for receiving interrogation signals. The signal applied to terminal 19 enables operation of transistors 13 and 14 for the reading or writing operation while terminal 21 serves as the word-sense terminal which operates in a manner to be more fully described.

The operation of the associative memory element 10 is as follows:

If a voltage variation is applied to terminals 22 and 23 from external circuitry in correspondence to an interrogation signal, the stored content of the bistable circuit is compared with the interrogation signal yielding a word-sense signal which will appear at terminal 21. The state of the bistable circuit depends upon the states of each of the MOS transistors 11 and 12. If, for example, transistor 11 is in the "ON" (i.e., conductive) state, or "OFF" (i.e., non-conductive) state, the values of the resistors 17 and 18 and the D.C. potential applied to terminal 20 are selected so as to cause transistor 12 to assume the "OFF" or "ON" state, respectively.

If transistor 11 is "ON" and transistor 12 is "OFF," the D.C. potential applied to terminal 20 and the values of resistors 17 and 18 are selected with reference to the electrical characteristics of transistors 11 and 12 so as to cause the voltage at terminal 26 to be nearly zero volts and to cause the voltage level at terminal 27 to be almost equal to the D.C. potential applied to terminal 20. In the reverse case, if transistor 11 is "OFF" and transistor 12 is "ON" the selected values of the above mentioned parameters will cause the potential at terminal 26 to be nearly equal to the voltage applied to terminal 20 while the potential at terminal 27 will be almost equal to zero volts. In an actual embodiment, the values of the D.C. potential applied to terminal 20 is determined as described above in accordance with the electrical characteristics of MOS transistors 11 and 12. For example, for an MOS transistor with a threshold voltage ($V_T$) of approximately minus 5 volts, the potential applied to terminal 20 is minus 10 volts.

The foregoing explanation relates to the operation of the bistable circuit in the case where the MOS transistors 13–16 of FIGURE 1 are all in the "OFF" states, i.e., when the potential of terminals 19, 22 and 23 is higher than the threshold voltage ($V_T$) of the MOS transistors (for example, when the potential is at zero volts).

Transistors 13 and 14 are employed when binary information is to be written in into the bistable circuit. As was described in the above mentioned copending application Ser. No. 611,868, to perform a writing operation, the potentials related to a state of an external binary bit is applied to terminals 24 and 25 simultaneously with the application of a selective signal to common terminal 19. For example, the potential of terminal 19 is altered from zero volts to a negative value (i.e., a value below $V_T$, for example, minus 15 volts). The voltages applied to terminals 24 and 25 (or at least one of them) is such as to drive the bistable element into the appropriate state representative of the storage of the external binary bit which is desired to be stored therein.

Information retrieval is performed by the application of the selective signal (mentioned above) to terminal 19 in order to obtain a readout (digit/sense) current from either terminals 24 or 25, the level of which will indicate the state of the bistable circuit.

MOS transistors 15 and 16, shown in FIGURE 1, comprise the major circuitry employed for the purpose of comparing interrogation information derived from an external source with the stored content of the associative memory element (i.e., with the stored content of the bistable element). When an interrogation signal is applied to either terminal 22 or 23, which signal level corresponds to the state of the external information bit, transistors 15 and 16 make a comparison between the content of the bistable circuit (i.e., its voltage states at terminals 26 and 27) and the interrogation signal to supply a word-sense signal developed at terminal 21.

As one example, let it be assumed that the potentials at terminals 26 and 27 are 0 volts and minus 10 volts, respectively, which represents the storage of a binary one in the bistable element. Let it further be assumed that when the terminals 26 and 27 are at minus 10 volts and 0 volts, respectively, that the bistable element is in a binary zero memory state. When the associative memory element 10 of FIGURE 1 is in a quiescent storage state, the potentials at terminals 19, 22 and 23 are normally held at zero volts while the potentials at terminals 24, 25 and 21 are held at minus 10 volts.

When the associative memory element of FIGURE 1 is in a binary one memory state, for example, and if the potential at terminal 22 is caused to vary from zero volts to minus 10 volts the current indicated by arrow 28 will flow from ground through transistor 11 and transistor 15 toward terminal 21. On the other hand, when the memory element is in a binary one state, even though the potential at terminal 23 is caused to vary from zero volts to minus 10 volts, transistor 16 remains in an "OFF" state—i.e., no current will flow out of terminal 21 to the peripheral word-sense circuitry since the potential at terminal 27 is at minus 10 volts. In other words, since terminals 27 and 21 are both at minus 10 volts no potential difference exists between these two terminals so that no current can flow in either direction.

When no current is available (i.e., flowing out of terminal 21) in the case where interrogation signals applied to terminal 23 (which signal is referred to as a binary one interrogation signal) the stored content of the memory element is recognized as being in a binary one state, i.e., the memory state of the associative memory element and the binary state of the external bit favorably compare with one another.

If no current is made available from terminal 21 when an interrogation signal is applied to terminal 22 (hereinafter referred to as a binary zero interrogation signal) the stored content of the memory element is detected as a binary zero state. In other words, when the stored content of the memory element is in agreement with the interrogation signal (in the cases where a binary zero interrogation signal is applied when the memory element is in a binary zero state or the binary one interrogation signal is applied when the memory element is in the binary one state) no current flows from terminal 21. However, it should be noted that when the interrogation signal and the stored state of the memory element disagree (i.e., mismatch) a current will flow out of terminal 21.

A suitable means for maintaining the potential at terminal 21 at a minus 10 volt level and a detection of a word-sense flowing out of terminal 21 can be achieved by a circuit which may, for example, include a PNP transistor wherein, as was explained in the above-mentioned copending application 611,868, the base of the transistor is connected to a minus 10 volt power supply and the emitter of the transistor is connected to terminal 21 of FIGURE 1.

In the case where the interrogation signal is in disagreement with the stored content of the associative memory element a current will be caused to flow through one of the two transistors 11 and 12 which form the bistable element of the associative memory element. In the case where a zero interrogation signal is applied to circuit 10, while the memory element is in a binary one state, a current will flow through transistor 11 in a direction shown by arrow 28 of FIGURE 1. In this case, if MOS transistor 11 lacks the capacity to supply a current of sufficient magnitude the potential at terminal 26 will be caused to increase in a negative direction so that its value will drop below the threshold value $V_T$. When the potential at terminal 26 drops below the threshold value, this will cause transistor 12 to be turned "ON" resulting in a destruction of the stored content of the memory element as a result of the application of a binary zero interrogation signal. In order to prevent the stored contents from being destroyed, the electrical characteristics of the MOS transistors must be improved so that the potential drop between the source and drain electrodes as a result of the current flowing through transistors 11 and 12 is quite small.

A consideration of the case wherein a binary zero interrogation signal is applied when the associative memory element is in a binary state will now be given. When a large negative voltage (i.e., minus 10 volts) is applied to terminal 21 the power consumed in the memory element is quite large as a result of the current flowing out of terminal 21. In order to reduce the power consumption, it is possible to maintain the potential at terminal 21 at close to zero volts. This modification, however, will fail to provide the desired results in the associative memory element design of FIGURE 1 for the following reasons:

If the potential at terminal 21 is maintained at minus 4 volts, for example, current will start to flow from terminal 26 toward terminal 21 due to the negative potential impressed upon the gate of MOS transistor 15 by way of terminal 22. This results in an increase of the potential at terminal 26 from minus 10 volts to minus 4 volts. As a result of this, MOS transistor 12 will be turned "ON," and the stored content of the memory element will be destroyed. In summary, it should therefore be noted that if the negative potential at terminal 21 is made small for the purpose of reducing power consumption during an interrogation operation, the stored content of the associative memory element is destroyed.

When a binary zero interrogation signal is applied to the associative memory element which is, for example, in a binary zero memory state, theoretically, there should be no variation in voltage or current at terminal 21. However, as a practical matter, noise is found to be generated in the circuit for the following reasons:

Since the potentials at terminal 26 and terminal 21 are maintained at minus 10 volts no current will flow from terminal 26 toward terminal 21 (or vice versa) as a result of a binary zero interrogation signal being applied to terminal 22. However, during the transient period in which the voltage applied to terminal 22 is varied from zero volts to minus 10 volts, current flows from terminal 21 toward terminal 22 (or vice versa) through a capacity (i.e., the inter-electrode capacitance) which exists between terminals 22 and 21 as a result of the stray capacity which exists between the drain and gate electrodes or between the gate and source electrodes of transistor 15. Since such a current generates a noise signal, the signal-to-noise ratio (S/N) of a word-sense signal flowing through terminal 21 to external circuitry (not shown) will be degraded.

If the binary zero interrogation signal applied to terminal 22 is made relatively small in amplitude for the purpose of reducing current flow from terminal 21 to terminal 22 or vice versa through the capacity existing between terminals 21 and 22, then the current flowing from terminal 26 toward terminal 21 is also quite small during the time in which a binary zero interrogation signal is applied to the memory element which is in a binary one state. Accordingly, it is quite difficult to improve signal-to-noise ratio (S/N) in the memory element design of FIGURE 1.

Whereas an explanation has been given with regard to the problems encountered when a binary zero interrogation signal is applied to the associative memory element which is in a binary one state as well as the case when a binary zero interrogation signal is applied when the memory element is in a binary zero state, it should be noted that due to the symmetry in design of the memory element the same problems arise when a binary one interrogation signal is applied to a memory element in the binary zero state as well as when a binary one interrogation signal is applied to a memory element in the binary one state. Thus, all four possible situations which may exist during an interrogation operation can result in faulty operation or destruction of the memory content.

Figure 2:
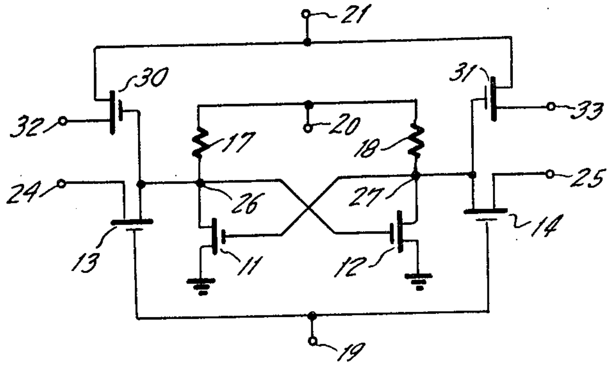
FIGURE 2 is a schematic diagram showing a memory element designed in accordance with the principles of the instant invention.

FIGURE 2 is a schematic diagram showing an associative memory element designed in accordance with the principles of the instant invention, which circuit design obviates all of the above mentioned defects. As between FIGURES 1 and 2, like numerals designate like components. The basic difference in circuitry between the associative memory elements of FIGURES 1 and 2 is that the MOS transistors 15 and 16 of FIGURE 1 have been substituted by MOS transistors 30 and 31, respectively, wherein the gate of transistor 30 is coupled to terminal 26 the gate of transistor 31 is coupled to terminal 27 the drain electrodes of transistors 30 and 31 are connected to terminals 32 and 33, respectively, and the source electrodes of transistors 30 and 31 are coupled in common to terminal 21. Thus, all reference numbers except those relating to MOS transistors 30 and 31 are identical to those shown in FIGURE 1. Since the basic operations of the embodiments of FIGURES 1 and 2 are broadly the same, only those differences which constitute the essence of the instant invention will be described herein.

In the associative memory element of the instant invention, it is a primary object to absolutely prevent a current from an external source to flow into terminal 21 and thereby into the associative memory element during an interrogation operation when the stored content of the memory element agrees with the interrogation signal while in the alternative case, a current will be allowed to flow when the interrogation signal and the memory state of the memory element are in disagreement. In the embodiment of FIGURE 2 the binary one interrogation signal is appiled to terminal 32 while a binary zero interrogation signal is applied to terminal 33. When interrogation is being performed, terminals 21, 32 and 33 are all maintained at the same potential. As a result thereof, no current will flow into the associative memory element through terminal 21 regardless of the state of the bistable circuit provided in the associative memory element.

Figure 3:
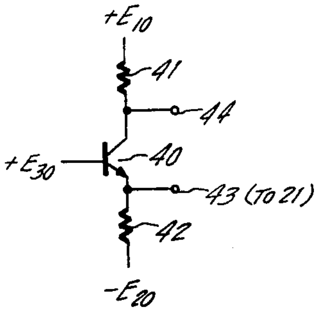
FIGURE 3 is a schematic diagram showing a word-sense circuit which may be employed in conjunction with the memory element of FIGURE 2, for interrogation operations.

In the case where it is desired to detect a current flowing into terminal 21 when the stored content of the memory element disagrees with the interrogation signal, it is proposed that the word-sense detecting circuit of FIGURE 3 be employed with the associative memory element of FIGURE 2. FIGURE 3 shows an NPN transistor 40 having its collector connected to resistor 41 whose opposite end is coupled to a positive D.C. potential $+E_{10}$. The emitter electrode is connected through resistor 42 to a negative D.C. potential $-E_{20}$. A potential $+E_{30}$ is applied to the base electrode. Terminal 44 coupled to the collector electrode is employed as an output terminal for detecting the presence of a disagreement (word-sense) signal voltage, while terminal 43 coupled to the emitter electrode functions as the input terminal of the word-sense signal current (i.e., terminal 43 should be coupled to terminal 21 of the circuit shown in FIGURE 2).

Transistor 40 is always in the ON or conductive state in order to be able to respond substantially instantaneously to a signal applied to terminal 43. However, in order that a sufficient voltage variation appear at output terminal 44, transistor 40 is biased so as to be below saturation when the current of a word-sense signal is applied to terminal 43 when conducting. This can be readily accomplished by suitable selection of the values of resistors 41 and 42 and suitable adjustment of the D.C. voltages $+E_{10}$, $-E_{20}$ and $+E_{30}$. Since terminal 43 of FIGURE 3 is connected to terminal 21 in FIGURE 2, the potential value at terminal 21 is determined by the voltage level $+E_{30}$ applied to the base electrode and the voltage drop between base and emitter of transistor 40. Even though a current flows from terminal 43 to terminal 21 in FIGURE 2, the potential at terminal 21 does not change. However, the potential at terminal 44 will be affected and hence will be lowered. Strictly speaking, although the value of the voltage drop between base and emitter electrodes of transistor 40 will vary due to the emitter current of transistor 40, this value may be considered as being negligible as a practical matter and it is quite satisfactory to consider that the potential at terminal 21 is maintained regardless of the current flowing from terminal 43 to terminal 21.

With the circuits of FIGURES 2 and 3 connected in the manner set forth above, the value of the potential $+E_{30}$ applied to the base electrode of transistor 40 is selected so that the potential at terminal 21 of FIGURE 2 will be at ZERO volts. When the interrogation operation is not being performed the potentials at terminals 32 and 33 in FIGURE 2 are maintained at ZERO volts so that no current will flow from the emitter electrode of transistor 40 to terminal 21 of FIGURE 2.

During an interrogation operation one of the potentials at terminals 32 and 33 is abruptly changed from ZERO volts to a negative potential. For example, during a binary ONE interrogation, the potential at terminal 32 is abruptly changed from ZERO volts to a negative value while the voltage at terminal 33 is held at ZERO volts. Similarly, during a binary ZERO interrogation operation, the potential at terminal 33 is abruptly changed from ZERO volts to a negative value while the voltage at terminal 32 is held at ZERO volts.

The state of the bistable circuit comprised of MOS transistors 11 and 12 is the same as was previously described wherein, when transistors 11 and 12 are in the ON and OFF states this corresponds to the storage of a binary ONE state and when they are respectively OFF and ON then a binary ZERO state is stored. The value of potential at terminal 20 and the values of resistors 17 and 18 are selected so that the potentials at terminals 26 and 27, in the binary ONE storage state are ZERO volts and minus 10 volts, respectively, and in the binary ZERO storage state are minus 10 volts and ZERO volts respectively.

Let it now be assumed that a binary ONE interrogation operation is to be performed while the associative memory element stores a binary ONE state. The operation is as follows:

Although the drain potential at transistor 30 (terminal 32) is abruptly changed from ZERO volts to a negative value, transistor 30 will not be turned ON since the potential at terminal 26 is nearly ZERO volts. Accordingly, no current flows from the emitter of transistor 40 (terminal 43) of FIGURE 3 to terminal 21 of FIGURE 2.

Similarly, when a binary ZERO interrogation operation is performed, while the memory element stores a binary ZERO STATE, the negative potential is applied to the drain of MOS transistor 31 (terminal 33). However, since the potential at terminal 27 is held at approximately ZERO volts, transistor 31 remains in the OFF state preventing a voltage to flow from terminal 43 of FIGURE 3 to terminal 21 of FIGURE 2.

Let it now be assumed that a binary ONE interrogation operation is performed when the memory element stores a binary ZERO state. Since the potential at the gate of MOS transistor 30 is at −10 volts and since the potential at terminal 33 is caused to change abruptly from zero volts to a negative value, MOS transistor 30 is turned ON causing a current to flow from the emitter of transistor 40 of FIGURE 3 to terminal 21 of FIGURE 2. This causes a change in the collector current of transistor 40 causing a change in the voltage drop of resistor 41 to develop an output voltage at terminal 44 corresponding to the word-sense signal.

Similarly, when a binary ZERO interrogation operation is performed while the memory element stores a binary ONE state transistor 31 is turned ON ultimately developing an output voltage at terminal 44 of transistor 40 in correspondence to a word-sense signal.

In the associative memory element of this invention, since the potentials at terminals 26 and 27 of the bistable circuit are respectively applied to the gates of MOS transistors 30 and 31. A current representing a word-sense signal does not flow in the bistable circuit even though the word-sense signal has been detected and hence no disturbances are applied to the bistable circuit. In addition thereto, any value of potential applied to the drain and source electrodes of transistors 30 and 31 which values lie within a range in which the transistors are not physically subjected to breakdown, the state of the bistable circuit will never be changed since the drain and source electrodes of these transistors are electrically insulated from their respective gates. This operation permits the use of small potential differences between drain and source electrodes of transistors 30 and 31 to be used during an interrogation operation so that the power consumed will be quite small in the presence of a disagreement condition during interrogation.

As an aid to the production of associative memory elements of the type shown in FIGURE 2, the transistors 11–14, 30 and 31 can all be formed on one surface of a single n-type silicon substrate or conversely can be formed on the surface of separate n-type silicon substrates. Regardless of the production method employed each silicon substrate is grounded so that the source potentials of transistors 11 and 12 and the potentials of the silicon substrates may be equal.

A current flowing from the terminal 32 or the terminal 33 toward the word-sense terminal 21 (of FIGURE 2) may delevolp noise in the word-sense detecting circuit of FIGURE 3 through the medium of a stray capacitance during the transient period of potential variation at terminals 32 or 33 as a result of application of an interrogation signal applied thereto. The predominant contributor of such a stray capacitance is the transistor 30 and the transistor 31. A consideration of the effect of such a stray capacitance will now be given for the case in which a binary ONE interrogation operation is performed while the associative memory element is in a binary ONE storage state.

During a binary ONE storage state transistors 11 and 12 are ON and OFF respectively, so that terminal 26 may be considered to be grounded. With these given conditions the equivalent circuit may be considered as that illustrated in FIGURE 4 in which an n-type silicon substrate of MOS transistor 30 is grounded in the manner previously described.

Figure 4:
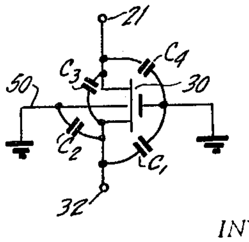
FIGURE 4 is a schematic diagram showing an equivalent circuit for one of the transistors employed in the memory element of FIGURE 2 which is useful in explaining the dynamic operation of the associative memory element of this invention.

The silicon substrate is represented by lead 50 in FIGURE 4 and actually surrounds the drain and source electrodes. Since the silicon substrate is grounded a stray capacitance $C_3$ between the source and drain electrodes can be made to be quite small and in any case much smaller than the stray capacitance $C_2$ which is the junction capacitance between the drain electrode and the silicon substrate, the stray capacitance $C_1$ which is the stray capacitance between drain and gate electrodes, and the stray capacitance $C_4$ between the source and gate electrodes.

One distinct advantage of the circuitry of the instant invention results from the fact that, when a binary ONE interrogation operation is performed when the memory is in a binary ZERO storage state, the amount of current flowing from the emitter of trannsistor 40 in FIGURE 3 toward terminal 21 of FIGURE 2 can be quite large even though the potential at terminal 32 is caused to change from ZERO volts to a small negative value due to the fact that the potential at the gate of MOS transistor 30 is already being maintained at approximately minus ten volts.

When employing conventional associative memory elements of the type shown in FIGURE 1 and when performing a binary ZERO interrogation operation with the memory storing a binary ONE state, the potential at terminal 26 is lowered as a result of the current flow toward terminal 21 and through transistor 15 as indicated by arrow 28 so as to drop the potential at the gate of transistor 15 to a rather low value. This means that the amplitude of potential variation applied to terminal 22 must be quite large. In the associative memory element of this invention, the amplitude of potential variation which must be provided for interrogation operation can be made quite small as is clear from the foregoing explanation. In addition thereto the stray capacity $C_3$ which may cause a noise signal, can be made quite small so that the signal-to-noise ratio (S/N) of the word-sense signal available at terminal 44 is extraordinarily greater than that previously obtainable.

Whereas one preferred embodiment of the instant invention has been described in connection with circuits of FIGURES 2, 3 and 4 it should be obvious that associative memory elements may be modified in a variety of different ways. For example, normally OFF N channel MOS transistors may be employed to form an associative memory element which is accompanied by a reversion in polarity of the D.C. biasing voltages and the signals applied thereto. Further, if desired, P channel MOS transistors may be substituted for the resistors 17 and 18 of FIGURE 2.

Viewing the embodiment of FIGURE 2 from the standpoint of connection to peripheral circuitry, it can clearly be seen that six terminals (namely terminals 13, 14, 19, 21, 32 and 33) require connection to peripheral circuitry while terminal 20 requires connection to a suitable D.C. voltage source. In the case where a memory plane employing a large number of such memory elements is to be constructed wherein the associative memory elements are arranged in an ordered matrix it can clearly be seen that a large number of connecting leads are required which greatly complicate the wiring for such a memory plane. The embodiment of FIGURE 5 teaches an arrangement in which the number of required connections is reduced by one-half.

Figure 5:
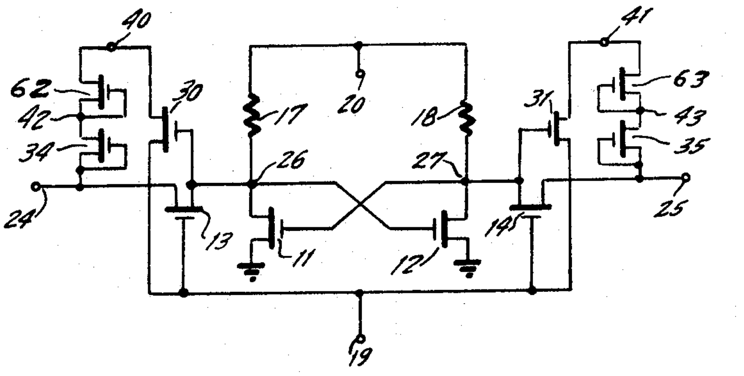
FIGURE 5 is a schematic diagram showing an alternative embodiment of the instant invention wherein the embodiment of FIGURE 2 may be so modified for the purpose of reducing the number of terminal connections to peripheral circuitry while providing all previous operations of the memory element.

The difference in the circuit configurations of the associative memory elements of FIGURE 1 (or the like) and FIGURE 5 is that the MOS transistor of FIGURE 1 is substituted by a circuit comprised of MOS transistor 30 whose gate is connected to terminal 26, whose source is connected with terminal 19 and whose drain is connected with terminal 40. In addition thereto series connected MOS transistors 62 and 34 are coupled between terminal 40 and terminal 24. The gate and drain electrodes of each of the transistors 62 and 34 are connected in common and the source electrode of transistor 62 is coupled to terminal 40 while the drain electrode of transistor 34 is connected to terminal 24 and the source electrode of transistor 34 is connected to the drain electrode of transistor 62 at terminal 42. MOS transistor 16 of FIGURE 1 is substituted in a substantially similar manner by the transistor 31 and the series connected transistors 63 and 35 which are arranged in a symmetrical fashion relative to the transistors 30, 62 and 34, respectively. Like numerals designate like components as betweent FIGURES 2 and 5 with the exception of the transistors 62, 63, 34 and 35 and the description of the circuitry of FIGURE 5 will therefore be limited to the manner in which the circuitry distinguishes from that shown in FIGURE 2 (or in FIGURE 1). The basic distinction of the arrangement of FIGURE 5 is that those terminals connected to peripheral circuitry perform dual functions. For example, terminals 24 and 25 are used for the purpose of applying interrogation signals during an interrogation operation and are further employed during the reading and writing operations. Terminal 19 is employed for the purpose of applying a selective signal enabling the bistable element of the associative memory to be forcibly driven into a selected memory state. Terminal 19 further performs the function of providing the word-sense output signal in the case of a disagreement condition when an interrogation operation is being performed. When the memory element is in the pure storage state (i.e., when no interrogation operation and when no reading or writing operation is being performed) the potential at terminal 19 is maintained at zero volts and the potentials at terminals 20, 24 and 25 are maintained at minus 10 volts.

Assuming that terminals 26 and 27 are at minus 10 volts and zero volts, respectively, during such a storage state, MOS transistor 31 will be in the OFF state while MOS transistor 30 will be in the ON state. The potential at terminal 40 at this time (which represents the junction between the drain electrode of transistor 30 and the source electrode of transistor 62) is held at nearly zero volts resulting in the application of a minus 10 volt drop between terminal 40 and terminal 24. If either of the series connected MOS transistors 62 and 34 is in an ON state (for example, consider transistor 34 to be in the on state) then the potential at terminal 42 which is the junction between the drain and source electrodes of transistors 62 and 34, respectively, will be higher than the potential at terminal 24 by a threshold voltage which may, for example, be $-4.5$ volts then MOS transistor 62 will remain in the OFF state allowing no current to flow through this series circuit. In a similar fashion, even though the potentials at terminals 26 and 27 are at zero volts and minus 10 volts, respectively, it can readily be seen that no current flows between the drain and source electrodes of MOS transistors 30 or 31. For purposes of explanation, it is assumed herein that a binary ONE state is stored in memory when terminals 26 and 27 are at zero volts and minus 10 volts, respectively, while a binary ZERO state is stored therein, when these terminals are at minus 10 volts and zero volts, respectively. It will further be assumed, for purposes of explanation that the potential at terminal 24 is changed from minus 10 volts to minus 14 volts to perform a binary ONE interrogation operation; that the potential at terminal 25 is changed from minus 10 volts to minus 14 volts to perform a binary ZERO interrogation operation; that the potential at terminal 19 is changed from zero volts to minus 15 volts for either a writing or reading operation.

When the operation of writing a binary ONE state into memory is to be performed the potential at terminal 24 is changed from minus 10 volts to minus 4 volts during the time that the selective signal (minus 15 volts) is applied to terminal 19. During the writing of a binary ZERO state into memory the potential at terminal 25 is abruptly changed from minus 10 volts to minus 4 volts while the selective signal (minus 15 volts) is applied to terminal 19. A readout operation is performed by a digit-sense current obtained from either terminal 24 or terminal 25 in accordance with the stored content of the memory element while the selective signal (minus 15 volts) is applied to terminal 19 as was mentioned above.

Figure 6:
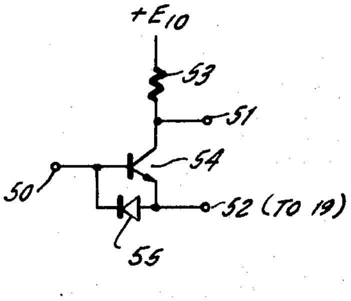
FIGURE 6 is a schematic diagram showing a peripheral circuit which may be employed with the memory element of FIGURE 5 for supplying a selective (word) signal as well as for detecting the result of comparison between an interrogation signal and the memory state stored in the memory element of FIGURE 5.

The circuit of FIGURE 6 may be employed with the associative memory element of FIGURE 5.

The circuit of FIGURE 6 which is capable of performing the dual operations mentioned above is comprised of an NPN transistor 54 whose collector is connected to a positive D.C. voltage $+E_{10}$ through resistor 53. The emitter of transistor 54 is coupled in common to the anode of diode 55 and to a terminal 52 while the base of transistor 54 is coupled in common to a terminal 50 and the cathode of diode 55. When the selective (negative) signal is applied to terminal 50 diode 55 becomes conductive causing a potential variation to occur at terminal 52, which potential variation is applied to terminal 19 of FIGURE 5 which is connected to terminal 52.

Figure 7:
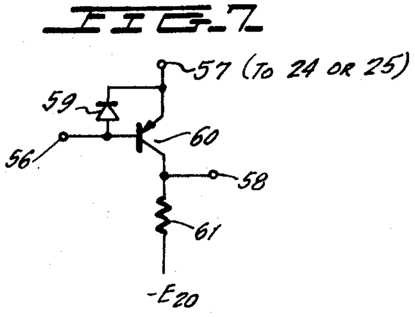
FIGURE 7 is a schematic diagram of an additional peripheral circuit which may be employed with the memory element of FIGURE 5 for detecting a digit/sense output as well as for supplying the interrogation signal and write-in information.

An additional circuit which is employed with the associative memory element of FIGURE 5 is shown in FIGURE 7 and is comprised of a PNP transistor 60 whose emitter electrode is connected in common to a terminal 57 and the cathode of diode 59. Terminal 57 is coupled to terminal 24 of FIGURE 5. A second circuit of the type shown in FIGURE 7 is also provided with its terminal 57 coupled to terminal 25 of FIGURE 5. The base of transistor 60 is coupled in common to a terminal 56 and the anode of diode 59 while the collector of transistor 60 is coupled in common to a terminal 58 and to one end of resistor 61 whose other end is coupled to a D.C. voltage source $-E_{20}$. When terminal 56 is supplied with a potential (positive going) variation due to a writing operation, diode 59 becomes conductive causing the potential at terminal 24 (or 25) of FIGURE 5 to change abruptly from minus 10 volts to minus 4 volts. During a readout operation the current flowing to terminal 57 affects the voltage level with the collector of transistor 60 as a result of a voltage drop in resistor 61 causing the potential at terminal 58 to be raised (to be positive going). When an interrogation signal is applied to terminal 56, the potential variation due to the interrogation signal is applied to terminal 57 via the base and emitter of transistor 60.

In order to consider the operation of the associative memory element of FIGURE 5 in combination with the circuits of FIGURES 6 and 7 the circuit of FIGURE 7 connected with terminal 24 of FIGURE 5 will hereinafter be referred to as ONE digit circuit and the circuit of FIGURE 7 to be connected to terminal 25 the ZERO digit circuit. The terminals 56 of the ZERO and ONE digit circuits has a negative potential applied thereto so as to make the potential at the terminals 24, 25 respectively, to be minus 10 volts. The terminal 50 of FIGURE 6 is supplied with a slightly positive voltage (usually about $+0.6$ volt) so as to make the potential at terminal 19 be at nearly zero volts.

Figure 8:
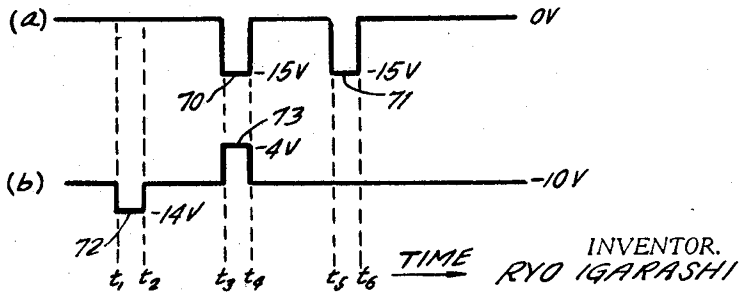
FIGURE 8 shows a plurality of waveforms useful for explaining the operation of the memory element embodiment of FIGURE 5.

A binary ONE interrogation operation will first be considered. Assuming that the associative memory elements stores a binary ONE state at this time, the operation is as follows:

The potential at terminal 24 is abruptly changed from minus 10 volts to minus 14 volts as indicated by the negative going pulse 72 of waveform *b* shown in FIGURE 8. This results from the application of a binary ONE interrogation signal to terminal 56 of the ONE digit circuit. Even though the potential at node 42 will be caused to change from minus 5 volts to minus 9 volts and the potential at mode 40 will be caused to change from zero volts to minus 4 volts, the MOS transistor 30 will be maintained in the OFF state since the gate of MOS transistor 30 is maintained at zero volts under control of the voltage state at terminal 26.

Let it now be assumed that a binary ONE interrogation operation is performed while the memory element of FIGURE 5 stores a binary ZERO state. The potential at terminal 24 is changed from minus 10 volts to minus 14 volts from the application of the negative going pulse 72 causing voltage level at terminal 40 to change from zero volts to a negative value. At this time MOS transistor 30 becomes conductive as a result of the minus 10 volts applied to the gate of MOS transistor 30 by terminal 26 of the bistable element. With these voltage conditions current flows to terminal 19. The magnitude of this current is controlled by the impedance of MOS transistor 30 when in the ON state and the impedances of MOS transistors 62 and 34 as well as the voltage applied to these impedances. The voltage at both ends of the serially connected impedances (transistors) is determined by the potential at terminal 19 (i.e., zero volts), the potential due to the binary ONE interrogation signal applied to terminal 24 (i.e., minus 14 volts), and the threshold voltage $V_T$ of MOS transistors 32 and 34. This voltage difference is about 4 volts. In this case the current flowing to terminal 19 is furnished through terminal 52 of FIGURE 6 from the emitter of transistor 54. Since the current flowing out of the emitter of transistor 54 alters the associated collector a voltage drop is developed across resistor 53 to lower the potential at terminal 51. In summary with transistor 30 being turned ON the current path is established from terminal 19 through transistor 30 to terminal 24. When a minus 14 volt level is applied to terminal 24, terminal 40 goes negative and in any case, is more negative than terminal 19, causing a current to flow in the direction from terminal 19 toward terminal 40.

As is obvious from a consideration of FIGURE 5, the associative memory element has a symmetrical arrangement so that a current will be caused to flow from the emitter of transistor 54 in FIGURE 6 into terminal 19 when a binary ZERO interrogation pulse is applied to terminal 25 when the memory is storing a binary ONE state the current will lower the potential at terminal 51 to provide a word-sense signal output. In a similar fashion, when the memory stores a binary ZERO state during a binary ZERO interrogation operation no change occurs at the terminal 51 of FIGURE 6 since the level at terminal 27 causes transistor 31 to be in the OFF state. In summary it can be seen that the associative memory cirruit comprised of FIGURES 5, 6 and 7 provides no output signal at terminal 51 of FIGURE 6 when the state of the associative memory element agrees with an interrogation signal and conversely provides a lower potential level at terminal 51 when the stored content of the associative memory element is in disagreement with the interrogation signal.

A writing operation will now be considered. For the writing operation a selective signal is applied to terminal 50 of FIGURE 6, as shown by negative going pulse 70 in waveform *a* of FIGURE 8 which causes the potential at terminal 19 to change abruptly from zero volt to minus 15 volts during the period $t_3$–$t_4$. Simultaneously therewith, a positive going pulse 73 as represented by waveform *b* of FIGURE 8, is applied to terminal 56 of the binary ONE digit circuit in order to write a binary ONE state into memory. Pulse 73 which is likewise applied during the time period $t_3$–$t_4$, causes the voltage at terminal 24 to change abruptly from minus 10 volts to minus 4 volts. Since the level at terminal 19 causes MOS transistor 13 to turn ON the voltage level at terminal 24 causes the potential at terminal 26 to change from minus 10 volts to minus 4 volts when the memory element is in the binary ZERO state so that the MOS transistor 12 is turned OFF.

Alternatively, when the potential of minus 15 volts is applied to terminal 19 turning MOS transistor 14 ON, the potential at terminal 27 goes from zero volts to nearly 10 volts. This causes MOS transistor 11 to be switched from OFF to ON and the potential at node 26 goes from minus 4 volts to zero volts.

At time $t_4$ the potentials at terminals 19 and 24 are respectively restored to zero volts and minus 10 volts by removal of the selective signal applied to terminal 50 and the binary ONE writing signal applied to terminal 56. This causes MOS transistors 13 and 14 to both return to the OFF states to complete the binary writing operation.

When the memory element stores a binary ONE state and a binary ONE writing condition is to be performed the potential at terminal 26 changes from zero volts to minus 4 volts as a result of the conduction of MOS transistor 13. However, since the ON state of the MOS transistor 11 and the OFF state of MOS transistor 12 do not change, the binary ONE state is retained even after the selective signal and the writing signal are removed. In a similar manner the write-in of a binary ZERO state is performed by applying the selective signal (pulse 70) to terminal 19 and by applying a binary ZERO writing signal to terminal 56 of the ZERO digit circuit. The binary ZERO state will be successfully stored therein regardless of the previous memory state of the associative memory element.

Next a reading operation will be considered. Let it first be assumed that the associative memory element stores a binary ONE condition. The potential level at terminal 19 is caused to change abruptly to minus 15 volts as shown by the negative going pulse 71 in waveform *a* of FIGURE 8, which pulse occurs during the time period $t_5$–$t_6$. The MOS transistor 13 is turned ON enabling a large current to flow from MOS transistors 11 and 13 to terminal 24 and then to terminal 57 of the ONE digit circuit. Although transistor 14 is likewise turned ON by the selective signal applied to terminal 19 it should be noted that the potential levels at terminals 27 and 25 are both at minus 10 volts so that no current flows from terminal 25 to the ZERO digit circuit. Accordingly, in the reading operation of an associative memory element in the binary ONE state, the potential at terminal 58 of the ONE digit circuit is raised as a result of a potential drop developed across resistor 61. This means that during the reading operation, whether the stored content is binary ONE or binary ZERO it can be readily detected by which of the terminals 58 of the ONE and ZERO digit circuits the potential variation is developed.

It can thus be seen from the foregoing description of the associative memory element of FIGURE 5 and its allied circuitry shown in FIGURES 6 and 7 that all the functions which may be performed by the circuits of either FIGURES 1 or 2 is capable of being performed by the circuit combinations of FIGURES 5–7 while at the same time the circuit connections of memory elements to their peripheral circuitry is reduced by one-half.

It should further be clear that an associative memory element employing the principles of FIGURE 5 may be modified in a variety of difference ways. For example the MOS transistors may be replaced by other electronic equivalents such as, for example, ordinary transistors. In addition thereto integrated circuit (IC) techniques may be employed in which semiconductor elements may be substituted for the resistors shown in the circuit of FIGURE 5.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Associative memory means capable of readout and interrogation in a non-destructive manner comprising a bistable circuit having first and second control terminals and third and fourth output terminals;

a read-write circuit comprised of first and second transistor means each having first, second and control electrodes; said first electrodes being coupled to said third and fourth output terminals respectively; said second electrodes selectively adapted to receive a writing signal during a writing operation and to selectively generate a readout signal during a reading operation;

a first common terminal coupled to both of said control electrodes for receiving a selective signal to turn said transistors ON during either a writing or reading operation;

an interrogation circuit comprising third and fourth transistors each having first, second and control electrodes;

the control electrodes of said third and fourth transistors being coupled to said third and fourth output terminals respectively;

the first electrodes of said third and fourth transistors being adapted to selectively receive interrogation signals to compare the state of said bistable circuit with an external information bit;

the second electrodes of said third and fourth transistors being connected in common to a second common terminal which is adapted to generate a signal as a result of disagreement between an interrogation signal state and the state of said bistable circuit;

said control electrodes of said third and fourth transistors being insulated from their associated first and second electrodes to prevent alteration or destruction of said bistable circuit during an interrogation operation.

2. The memory means of claim 1 further comprising a word sense detecting circuit comprising fifth transistor means having first, second and control electrodes; first and second two terminal impedance means each having a first terminal connected to said fifth transistor first and second electrodes respectively;

means for applying constant voltage levels to the second terminals of said impedance means and said control electrode;

one of said first and second electrodes being coupled to said second common terminal for selectively supplying a current to said second common terminal during an interrogation operation when the states of the interrogation signal and the bistable circuit are in disagreement.

3. The associative memory means of claim 1 wherein said bistable circuit is comprised of fifth and sixth transistors each having first, second and control electrodes; the second and control electrodes of said fifth transistor being cross-coupled with the second and control electrodes of said sixth transistor;

the first electrodes of said fifth and sixth transistors being connected to a third common terminal;

a D.C. source; first and second impedance means respectively coupling the second electrodes of said fifth and sixth transistors to said D.C. source;

the second electrodes of said fifth and sixth transistors acting as said third and fourth output terminals.

4. The memory means of claim 3 wherein at least two of said transistors are of the N-channel MOS transistor type each having drain, source and gate electrodes corresponding to said first, second and said control electrodes.

5. The memory means of claim 3 wherein at least two of said transistors are of the P-channel MOS transistor type each having drain, source and gate electrodes corresponding to said first and second and said control electrodes.

6. The memory means of claim 1 wherein means are provided for short-circuiting said first and second common terminals;

first and second impedance means each coupled between the second and first electrodes of said first and third and said second and fourth transistors respectively.

7. The memory means of claim 6 wherein said first and second impedance means are each comprised of semiconductor means.

8. The memory means of claim 6 wherein said first and second impedance means are each comprised of first and second series connected semiconductor means.

9. The memory means of claim 6 further comprising a combined word-sense, read-write circuit including fifth transistor means having emitter, base and collector electrodes;

diode means coupled between said emitter and base electrodes in reverse polarity to the emitter-base junction;

said base electrode being adapted to receive a selective signal during either a write or read operation;

said emitter being connected to said first and second common terminals for applying a selective signal thereto during a write or read operation and applying a word-sense signal thereto in the presence of a disagreement during an interrogation operation;

bias means; impedance means coupling said bias means to said collector; said impedance means generating an increased voltage drop upon disagreement during an interrogation operation.

10. The memory means of claim 6 further comprising a pair of interrogation circuits for applying interrogation signals to said memory means during interrogation and for receiving or applying signals from or to said memory means during a read or writing operation;

each of said circuits being comprised of a transistor having emitter, base and collector electrodes;

diode means coupled across said emitter and base electrodes in reverse polarity to the emitter-base junction;

bias means, impedance means coupling said bias means to said collector;

each of said emitters being coupled to an associated second electrode of said first and second transistor;

said base electrodes being adapted to selectively receive interrogation signals during an interrogation operation;

said emitters being adapted to selectively receive a signal from said bistable circuit during a read operation and to selectively apply a signal to said bistable circuit during a write operation.

11. The memory means of claim 6 wherein said first and second impedance means are each comprised of first and second series connected MOS transistor means each having drain, source and gate electrodes.

12. The memory means of claim 11 wherein said MOS transistors each have their gate electrodes short-circuited to one of their drain or source electrodes.

References Cited

UNITED STATES PATENTS

| | | | |
|---|---|---|---|
| 3,031,650 | 4/1962 | Koerner | 340—173 X |
| 3,284,782 | 11/1966 | Burns | 340—173 |
| 3,354,440 | 11/1967 | Farber et al. | 340—173 |

BERNARD KONICK, *Primary Examiner.*

J. F. BREIMAYER, *Assistant Examiner.*